United States Patent
Okamuro et al.

(10) Patent No.: US 7,576,859 B2
(45) Date of Patent: Aug. 18, 2009

(54) ALIGNMENT APPARATUS AND ALIGNMENT METHOD

(75) Inventors: Takuma Okamuro, Nagano-ken (JP);
Motonori Okumura, Nagano-ken (JP);
Mutsuhiko Ota, Nagano-ken (JP);
Kazutoshi Goto, Nagano-ken (JP); Isao Yanagisawa, Chino (JP); Yasuo Inaoka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/854,075

(22) Filed: Sep. 12, 2007

(65) Prior Publication Data
US 2008/0062420 A1   Mar. 13, 2008

(30) Foreign Application Priority Data
Sep. 13, 2006  (JP) .............................. 2006-248740

(51) Int. Cl.
*G01B 11/00* (2006.01)
*B41J 29/393* (2006.01)

(52) U.S. Cl. ........................................ 356/401; 347/19
(58) Field of Classification Search .................... None
See application file for complete search history.

(56) References Cited

U.S. PATENT DOCUMENTS

| | | | | |
|---|---|---|---|---|
| 4,614,431 | A * | 9/1986 | Komeyama | 356/401 |
| 5,723,053 | A * | 3/1998 | Momose et al. | 216/27 |
| 6,340,821 | B1 * | 1/2002 | Brown | 250/548 |
| 7,057,707 | B2 * | 6/2006 | Hansen | 355/55 |
| 2006/0268063 | A1 * | 11/2006 | Inaoka et al. | 347/54 |
| 2008/0062218 | A1 * | 3/2008 | Yanagisawa et al. | 347/19 |
| 2008/0062436 | A1 * | 3/2008 | Inaoka et al. | 356/620 |
| 2008/0068420 | A1 * | 3/2008 | Yanagisawa et al. | 347/19 |
| 2008/0068610 | A1 * | 3/2008 | Okamuro et al. | 356/401 |

FOREIGN PATENT DOCUMENTS

| | | |
|---|---|---|
| JP | 2001-153608 A | 6/2001 |
| JP | 2002-160376 A | 6/2002 |
| JP | 2006-326937 A | 12/2006 |
| JP | 2006-327024 A | 12/2006 |
| JP | 2006-327025 A | 12/2006 |

\* cited by examiner

*Primary Examiner*—Gregory J Toatley, Jr.
*Assistant Examiner*—Gordon J Stock, Jr.
(74) *Attorney, Agent, or Firm*—Sughrue Mion, PLLC

(57) ABSTRACT

An alignment apparatus, which is used when positioning and joining a plurality of workpieces relative to each other, each workpiece having a plurality of alignment marks for alignment, the alignment apparatus includes: a transparent mask provided with reference marks with which the alignment marks are aligned; a mirror disposed between the mask and the workpiece; an optical unit having an optical axis pointed in a direction of the mirror via the reference mark from a side of the mask opposite to the mirror, the optical unit enabling the reference mark and a virtual image of the reference mark reflected in the mirror to be observed simultaneously; and an adjusting unit for making optical axis adjustment of the optical axis, based on the observation by the optical unit, such that a real image of the reference mark and the virtual image of the reference mark reflected in the mirror are superposed.

7 Claims, 9 Drawing Sheets

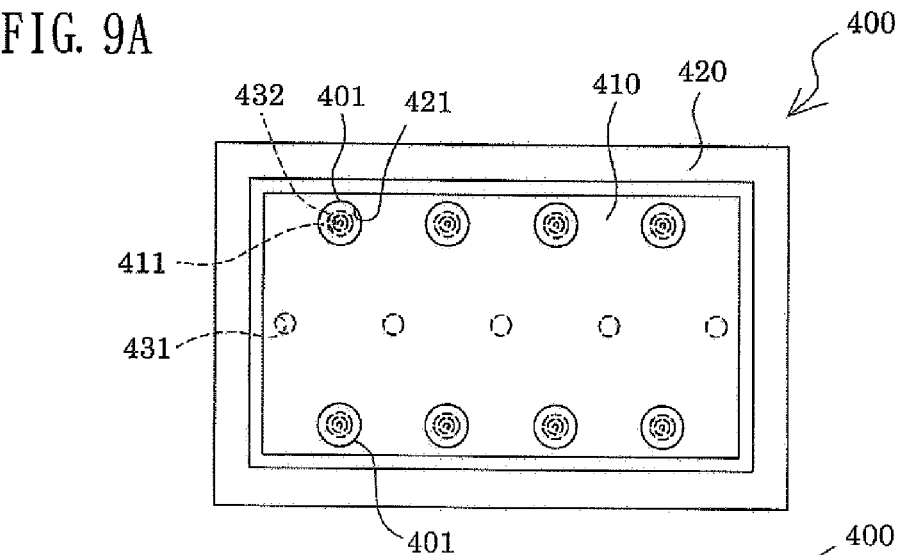
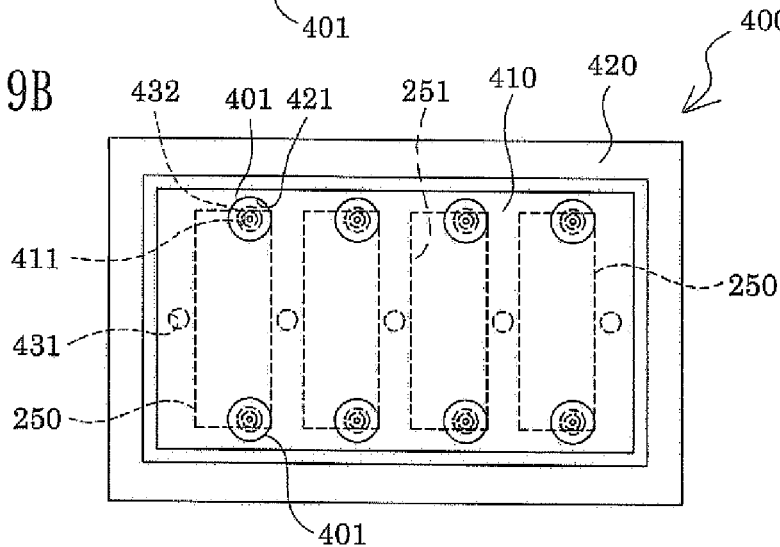
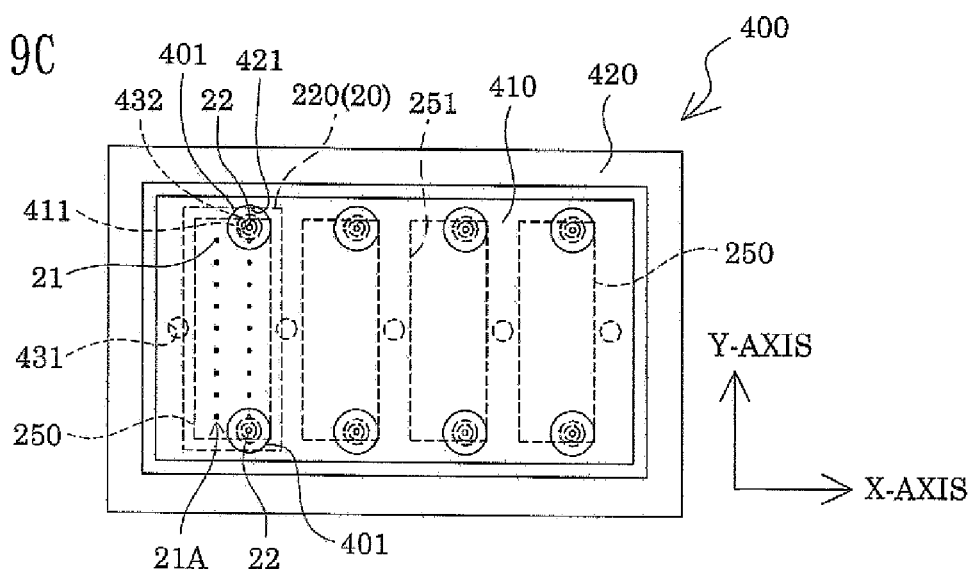

ALIGNMENT APPARATUS AND ALIGNMENT METHOD

The entire disclosure of Japanese Patent Application No. 2006-248740 filed Sep. 13, 2006 is expressly incorporated by reference herein.

BACKGROUND

1. Technical Field

This invention relates to an alignment apparatus and an alignment method, which are useful, particularly, when used in adjusting the optical axis of an optical means in a predetermined manner.

2. Related Art

An ink-jet recording apparatus, such as an ink-jet printer or an ink-jet plotter, is equipped with an ink-jet recording head unit (may be hereinafter referred to as a head unit) including an ink-jet recording head which ejects, as ink droplets, ink accommodated in a liquid accommodation portion such as an ink cartridge or an ink tank. The ink-jet recording head has nozzle rows comprising rows of nozzle orifices arranged in parallel, and has its ink ejection surface side covered with a cover head. The cover head has a window frame portion having an opening window portion provided on the ink droplet ejection surface side of the ink-jet recording head for exposing the nozzle orifices, and has a side wall portion formed by being bent from the window frame portion beside the side surface of the ink-jet recording head. The cover head is fixed by having the side wall portion joined to the side surface of the ink-jet recording head (see, for example, JP-A-2002-160376 (page 4, FIG. 3)).

When the cover head and a fixing member, such as a fixing plate, are to be joined to a plurality of the ink-jet recording heads, the ink-jet recording heads are moved with respect to the fixing member for predetermined positioning so that an alignment mark provided in a nozzle plate of the ink-jet recording head aligns with a reference mark provided in a flat plate-shaped glass mask. In further detail, the reference mark and the alignment mark corresponding positionally thereto are simultaneously observed with an optical means having the optical axis pointed in the direction of the alignment mark from the mask side via the reference mark, and the position of the ink-jet recording head is adjusted based on the observation such that the reference mark and the alignment mark are superimposed. Thus, it is desirable for the optical axis of the optical means to be pointed accurately in the direction of the reference mark and the alignment mark.

To achieve the rapidity or rationalization of alignment, in particular, it is conceivable to carry out alignment with two alignment marks of one ink-jet recording head as a workpiece, at a stroke, while observing the two alignment marks by use of optical means such as two microscopes. In this case, it is necessary to make adjustments so as to avoid relative displacement of the optical axes of the respective optical means.

An earlier technology concerned with this type of optical axis alignment was designed to carry out alignment in consideration of the amount of displacement of the alignment mark due to inclination between the optical axis and the alignment mark/workpiece (see, for example, JP-A-2001-153608 (page 4, FIG. 2)).

With the above-mentioned optical axis alignment method according to the earlier technology, however, the amount of displacement needs to be computed, and a correction is made based on the amount of displacement found by computation. Thus, the alignment mark cannot be visually recognized, and alignment is difficult.

Such problems occur not only during alignment associated with the production of an ink-jet recording head unit, but also during alignment associated with the production of other liquid-jet head units.

SUMMARY

An advantage of some aspects of the present invention is to provide an alignment apparatus and an alignment method which can adjust the optical axis of an optical means easily into a normal state and contribute to high accuracy alignment.

According to an aspect of the invention, there is provided an alignment apparatus, which is used when positioning and joining a plurality of workpieces relative to each other, each workpiece having a plurality of alignment marks for alignment, the alignment apparatus comprising: a transparent mask provided with reference marks with which the alignment marks are aligned; a mirror disposed between the mask and the workpiece; an optical unit having an optical axis pointed in a direction of the mirror via the reference mark from a side of the mask opposite to the mirror, the optical unit enabling the reference mark and a virtual image of the reference mark reflected in the mirror to be observed simultaneously; and an adjusting unit for making optical axis adjustment of the optical axis, based on the observation by the optical unit, such that a real image of the reference mark and the virtual image of the reference mark reflected in the mirror are superposed.

According to this aspect, the optical axis is adjusted, based on the observation by the optical unit, such that the real image of the reference mark and the virtual image of the reference mark reflected in the mirror are superposed. Upon completion of such adjustment, the optical axis is perpendicular to the mask. If alignment is performed such that the reference mark and the alignment mark are located on this optical axis, therefore, high accuracy positioning of the workpiece can be accomplished.

It is preferable that the mirror is disposed such that when a distance from the reference mark of the mask to the alignment mark of the workpiece is d, a distance from the reference mark to the mirror is $(1/2) \cdot d$.

According to this embodiment, the position of the virtual image of the reference mark reflected in the mirror can be brought into coincidence with the position of the alignment mark of the workpiece. Thus, if the focal position of the optical unit is brought to the virtual image, the alignment mark can be automatically focused on during alignment. Consequently, high accuracy positioning can be easily carried out, including focusing.

It is also preferable that the mask has a protrusion protruding along the optical axis toward the alignment mark, and the reference marks are provided in the protrusion.

According to this embodiment, the distance between the reference mark and the alignment mark can be reduced. As a result, displacement of the optical axis can be minimized. Moreover, the mask can be supported by a thick member, namely, a member having sufficient rigidity, and displacement due to warpage of the member or the like is not caused. Thus, even higher accuracy positioning can be carried out.

It is also preferable that the alignment apparatus further comprises a plurality of the optical units having a plurality of the optical axes independent of each other.

According to this embodiment, the optical axis of the optical unit can be adjusted easily. Such an embodiment can be applied to the relative adjustment of the optical axes of a plurality of the optical units. This is because the optical axes after adjustment are all perpendicular to the plane of the mask.

As a result, one workpiece can be positioned at a predetermined position based on two of the alignment marks with the use of the plurality of optical units. In addition, this positioning can be performed highly accurately. That is, prompt and highly accurate alignment can be performed for one workpiece by a single operation.

It is also preferable that the optical unit is composed of a bifocal microscope including two optical systems having the optical axis in common, one of the optical systems being capable of focusing on the real image of the reference mark, and the other optical system being capable of focusing on the virtual image of the reference mark reflected in the mirror.

According to this embodiment, the real image of the reference mark and its virtual image reflected in the mirror can be seen at the same time using the bifocal microscope. Furthermore, the real image and the virtual image individually focused by one optical system and the other optical system can be superimposed, whereby predetermined optical axis adjustment can be made. That is, the depth of field of each optical system can be minimized, and the magnification can be increased accordingly.

As a result, the optical axis adjustment of the optical unit can be made with high accuracy, and predetermined positioning of the workpiece can be made with even higher accuracy.

It is also preferable that the workpiece is a liquid-jet head.

According to this embodiment, the same actions and effects as those in the above embodiments are obtained for alignment of the plurality of liquid-jet heads.

According to another aspect of the invention, there is provided an alignment method, which is used when positioning and joining a plurality of workpieces relative to each other, each workpiece having a plurality of alignment marks for alignment, the alignment method comprising the steps of: disposing a mirror between a mask and the workpiece such that the mask and the mirror are opposed to each other, the mask, as a transparent member, being provided with reference marks with which the alignment marks are aligned, the mirror reflecting an image of the reference mark to form a virtual image of the reference mark; simultaneously observing the reference mark and the virtual image of the reference mark reflected in the mirror by an optical unit having an optical axis pointed in a direction of the mirror from a side of the mask; and making optical axis adjustment of the optical axis, based on the observation by the optical unit, such that a real image of the reference mark and the virtual image of the reference mark reflected in the mirror are superposed.

According to this embodiment, the optical axis is adjusted, based on the observation by the optical unit, such that the real image of the reference mark and the virtual image of the reference mark reflected in the mirror are superposed. Upon completion of such adjustment, the optical axis can be rendered perpendicular to the mask. If alignment is performed such that the reference mark and the alignment mark are located on this optical axis, therefore, high accuracy positioning of the workpiece can be accomplished. Even in the presence of a plurality of the optical axes, relative relationship between the optical axes can be rendered constant with ease.

BRIEF DESCRIPTION OF THE DRAWINGS

The invention will be described with reference to the accompanying drawings, wherein like numbers reference like elements.

FIGS. 9A to 9C are bottom views for illustrating a positioning method using the alignment apparatus.

DESCRIPTION OF EXEMPLARY EMBODIMENTS

Ink-jet Recording Head Unit:

Prior to describing an alignment apparatus according to an embodiment of the invention, an explanation will be offered for an ink-jet recording head unit having an ink-jet recording head. The ink-jet recording head is an example of a workpiece which undergoes the alignment concerned.

Figure 1:
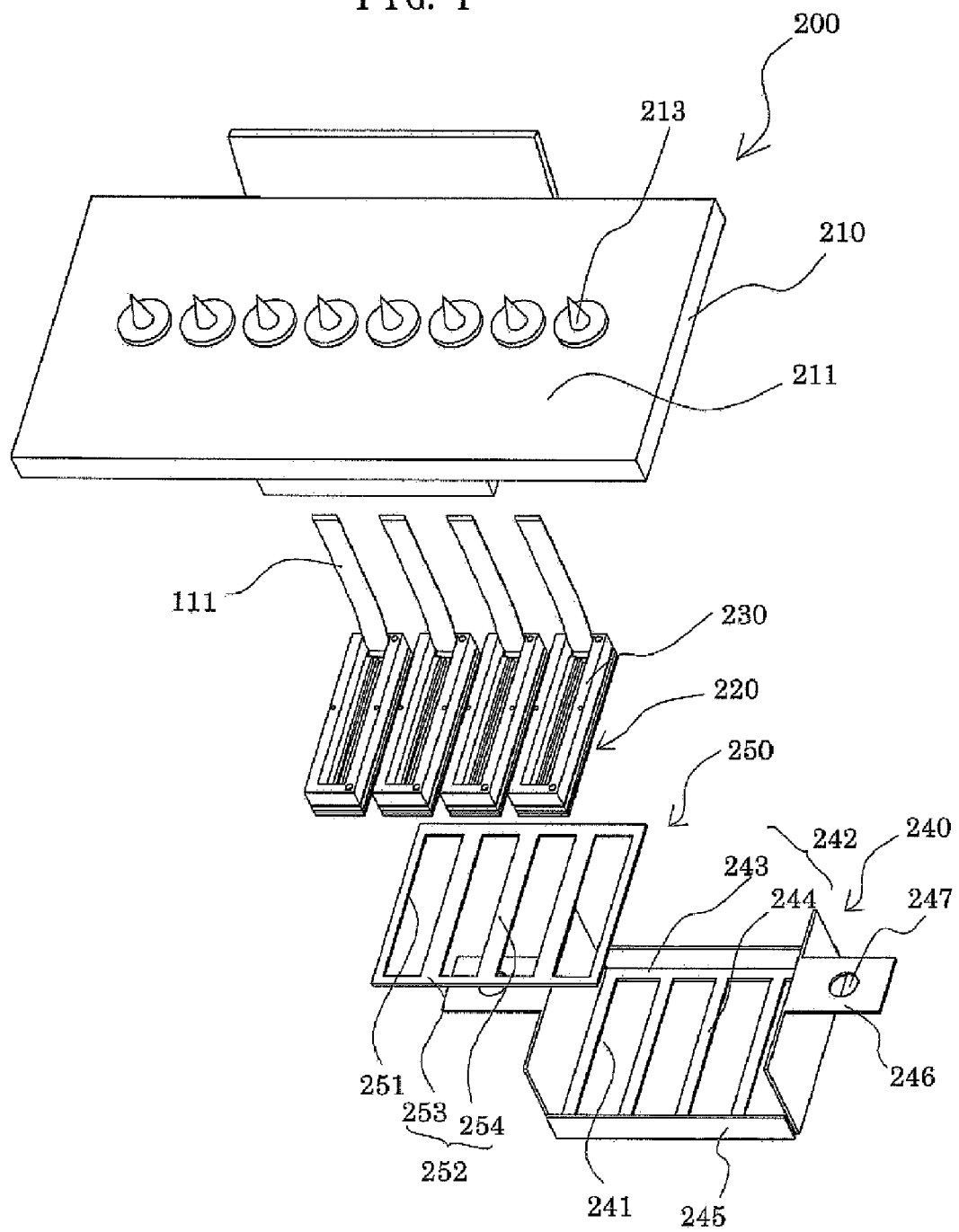
FIG. 1 is an exploded perspective view of a head unit for which predetermined alignment is performed according to an embodiment of the invention.
Figure 2:
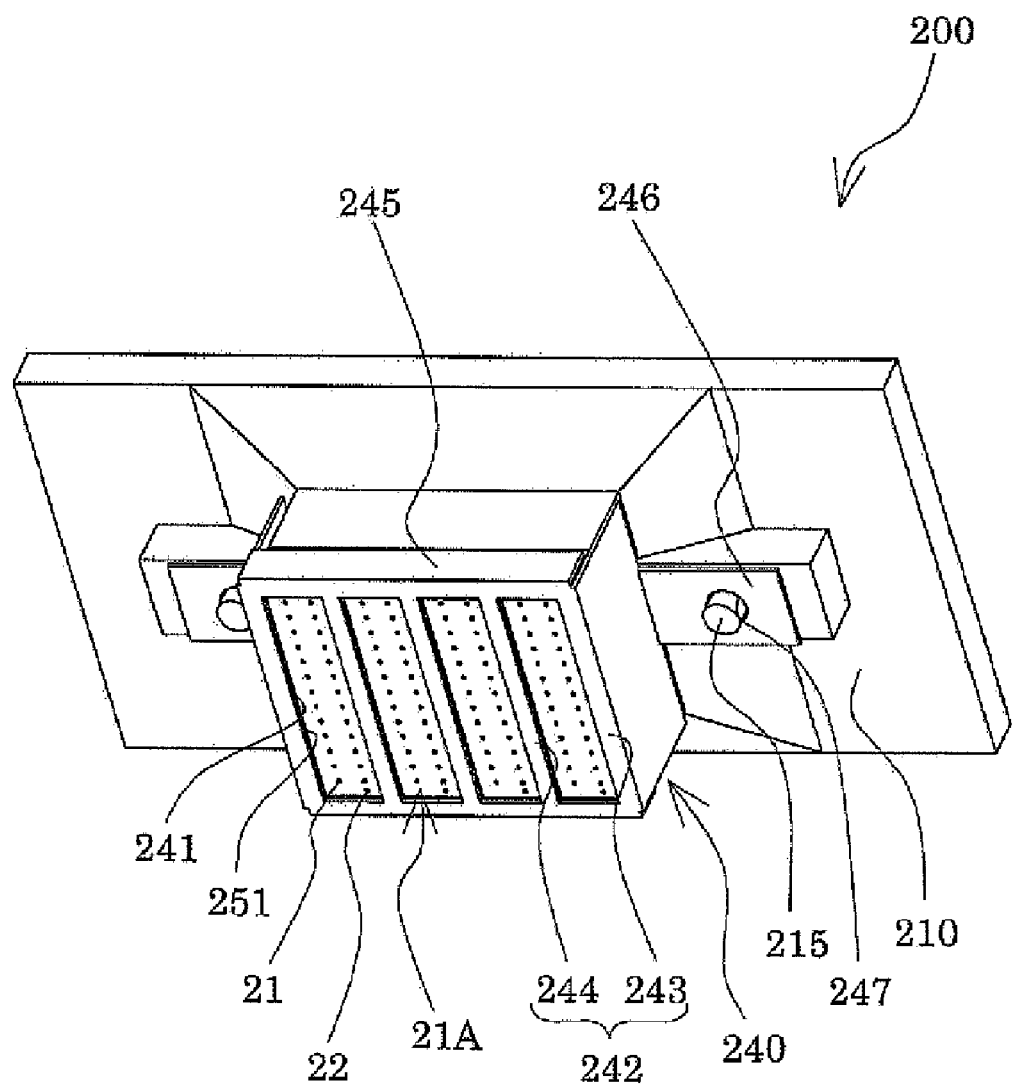
FIG. 2 is a perspective view of the head unit after assembly.
Figure 3:
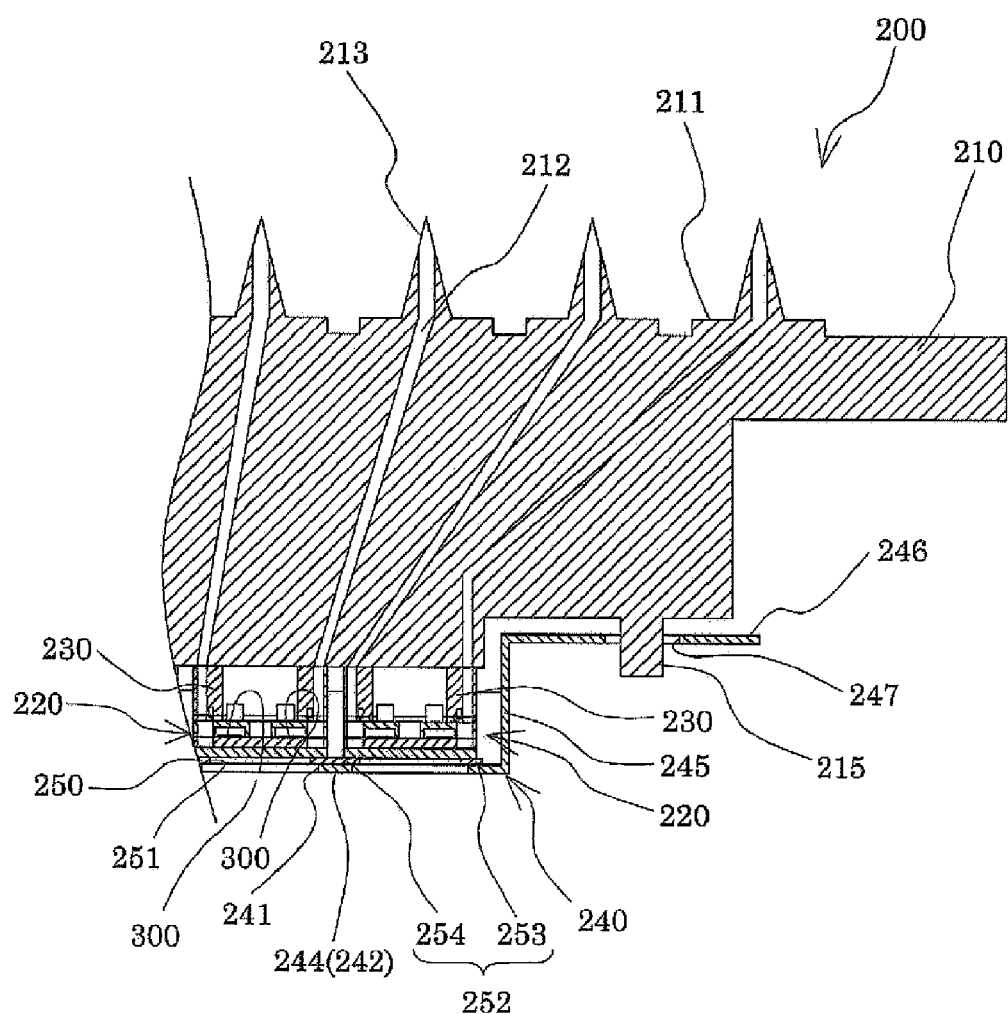
FIG. 3 is a sectional view of essential portions of the head unit.

FIG. 1 is an exploded perspective view of the ink-jet recording head unit. FIG. 2 is a perspective view of the ink-jet recording head unit after assembly. FIG. 3 is a sectional view of essential portions of the ink-jet recording head unit.

As shown in these drawings, an ink-jet recording head unit 200 (to be referred to hereinafter as head unit 200) has a cartridge case 210, an ink-jet recording head 220, a cover head 240, and a fixing plate 250.

Of these members, the cartridge case 210 is a holding member for ink cartridges (not shown), which has a cartridge mounting portion 211 where the ink cartridges are mounted. The ink cartridges are ink supply means which are individually composed and, for example, filled with a black ink and three-color inks. That is, the cartridge case 210 is mounted with the ink cartridges of different colors.

As specified, particularly, in FIG. 3, the cartridge case 210 is provided with a plurality of ink communicating paths 212 each of which has one end opening to the cartridge mounting portion 211, and the other end opening to a head case 230. To portions of the cartridge mounting portion 211 where the ink communicating paths 212 are open, ink supply needles 213 are fixed which are inserted into ink supply ports of the ink cartridges. This fixing is carried out via filters (not shown) which are formed in the ink communicating paths 212 in order to remove air bubbles or foreign matter within ink.

The head case 230 is secured to the bottom surface of the cartridge case 210. The ink-jet recording head 220 has a plurality of piezoelectric elements 300, and ejects ink droplets through a nozzle orifice 21 at an end surface on a side opposite to the cartridge case 210 by driving of the piezoelectric element 300. A plurality of the ink-jet recording heads 220 are provided in correspondence with the different ink colors so as to eject the different colors of inks from the ink cartridges. Thus, a plurality of the head cases 230 are provided independently in correspondence with the ink-jet recording heads 220.

Figure 4:
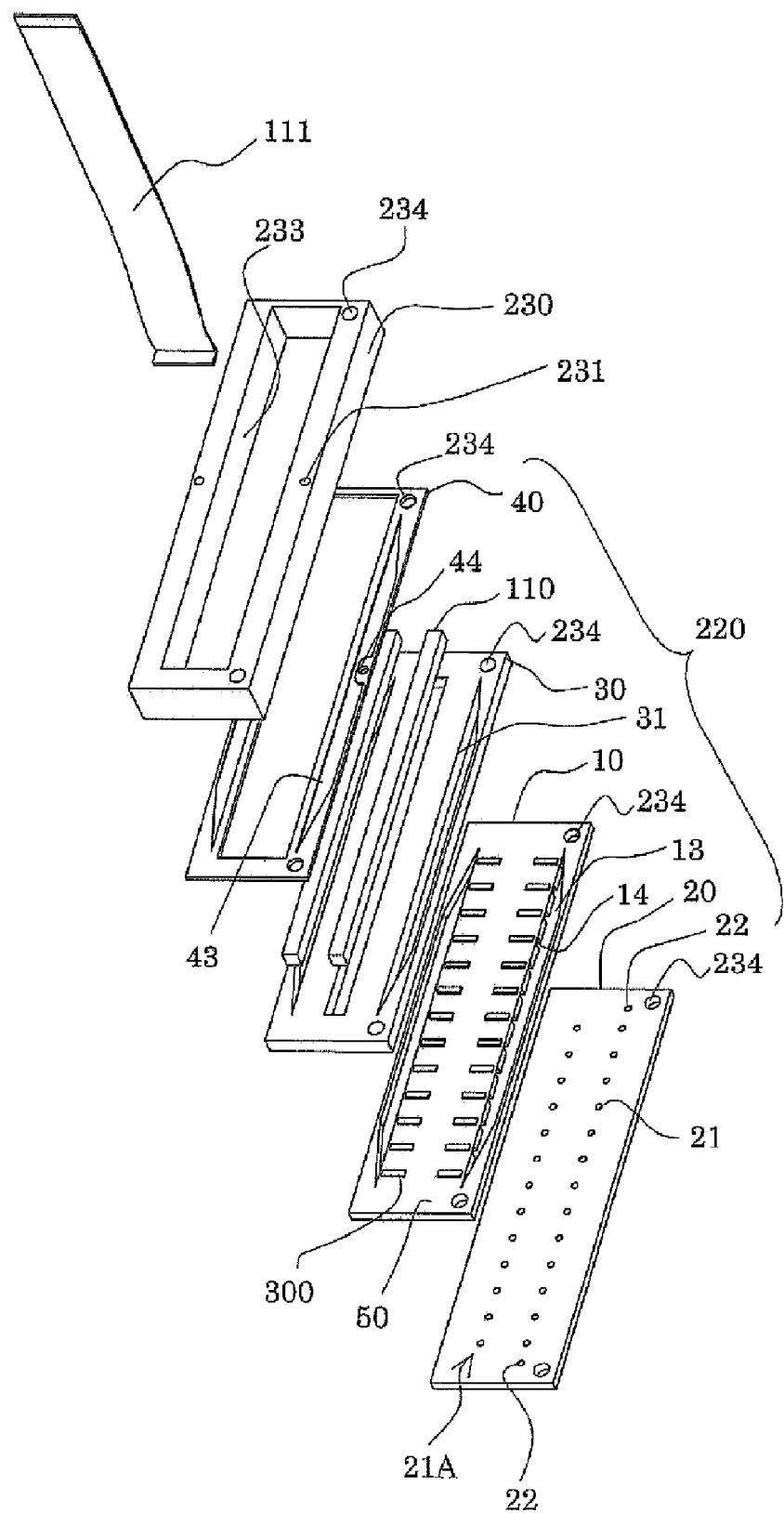
FIG. 4 is an exploded perspective view of the essential portions of the head unit.
Figure 5:
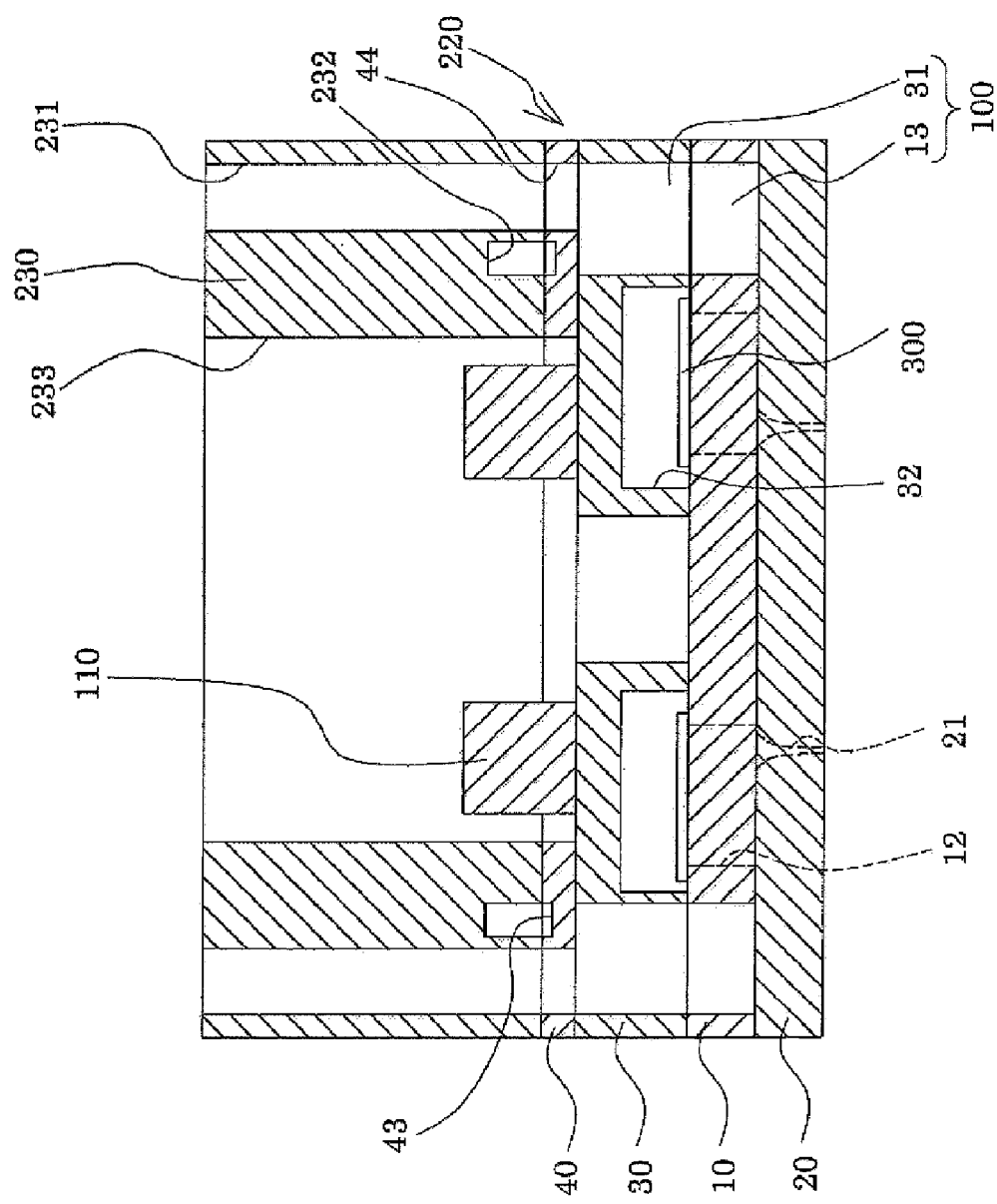
FIG. 5 is a sectional view showing a recording head and a head case of the head unit.

The above-described ink-jet recording head 220 and head case 230 will be described in further detail by additional reference to FIGS. 4 and 5. FIG. 4 is an exploded perspective view of the essential portions of the ink-jet recording head 220 and the head case 230. FIG. 5 is a sectional view of the ink-jet recording head 220 and the head case 230.

As shown in FIGS. 4 and 5, the ink-jet recording head 220 is composed of four plates, i.e., a nozzle plate 20, a passage-forming substrate 10, a protective plate 30, and a compliance plate 40. Of these plates, the passage-forming substrate 10, in the present embodiment, comprises a single crystal silicon substrate, and has an elastic film 50 formed on one surface thereof, the elastic film 50 comprising silicon dioxide formed by thermal oxidation. In the passage-forming substrate 10, pressure generating chambers 12 separated by a plurality of compartment walls are formed. In the present embodiment, the pressure generating chambers 12 are arranged in sets of two in the width direction of the passage-forming substrate 10, forming two rows of the pressure generating chambers 12. These pressure generating chambers 12 have been created by anisotropic etching performed from the other surface of the passage-forming substrate 10. Longitudinally outwardly of the pressure generating chambers 12 of each row, a communicating portion 13 is formed which communicates with a reservoir portion 31 provided in the protective plate 30 (to be described later) to constitute a reservoir 100 serving as a common ink chamber for the pressure generating chambers 12. The communicating portion 13 is in communication with an end portion in the longitudinal direction of each pressure generating chamber 12 via an ink supply path 14.

The nozzle plate 20 is secured to the opening surface side of the passage-forming substrate 10 via an adhesive agent, a heat-fused film or the like. The nozzle plate 20 has the nozzle orifices 21 each of which communicates with each pressure generating chamber 12 on a side opposite to the ink supply path 14. In the present embodiment, one ink-jet recording head 220 is provided with two nozzle rows 21A comprising two rows of the nozzle orifices 21 arranged parallel.

The nozzle plate 20 can be formed preferably from a glass-ceramics, a single crystal silicon substrate, or a stainless steel which has a thickness, for example, of 0.01 to 1 mm, and a coefficient of linear expansion, for example, of 2.5 to 4.5 ($10^{-6}$/° C.) at 300° C. or lower. The nozzle plate 20 is provided with an alignment mark 22 (to be described in detail later) which is used for alignment with the fixing plate 250. In the present embodiment, two of the alignment marks 22 are provided at end portions in the parallel-arrangement direction of the nozzle orifices 21.

On the side of the passage-forming substrate 10 opposite from its opening surface, the piezoelectric elements 300 are disposed on the elastic film 50. The piezoelectric elements 300 are formed by sequentially stacking an insulation film comprising zirconium oxide, a lower electrode film comprising a metal, a piezoelectric layer comprising lead zirconate titanate (PZT) or the like, and an upper electrode film comprising a metal.

The protective plate 30 is joined onto the passage-forming substrate 10 on which the piezoelectric elements 300 are formed. The reservoir portion 31, in the present embodiment, is formed to penetrate the protective plate 30 in its thickness direction and to extend in the width direction of the pressure generating chamber 12. As stated earlier, the reservoir portion 31 is brought into communication with the communicating portion 13 of the passage-forming substrate 10 to constitute the reservoir 100 serving as the common ink chamber for the pressure generating chambers 12. In a region of the protective plate 30 opposite the piezoelectric element 300, a piezoelectric element holding portion 32 is provided which has a space enough not to impede the movement of the piezoelectric element 300. Such a protective plate 30 can be suitably formed from glass, ceramic, metal, or plastic, but it is preferred to use a material having nearly the same thermal expansion coefficient as that of the passage-forming substrate 10. In the present embodiment, the protective plate 30 is formed using a single crystal silicon substrate which is the same material as that of the passage-forming substrate 10.

A drive IC 110 for driving each piezoelectric element 300 is provided on the protective plate 30. Each terminal of the drive IC 110 is connected to lead-out wiring withdrawn from an individual electrode of each piezoelectric element 300 via a bonding wire or the like (not shown). Each terminal of the drive IC 110 is connected to the outside via external wiring 111, such as a flexible printed cable (FPC), as shown in FIG. 1 to receive various signals, such as a print signal, from the outside via the external wiring 111.

The compliance plate 40 is joined onto the protective plate 30. In a region of the compliance plate 40 opposed to the reservoir 100, an ink introducing port 44 for supplying ink to the reservoir 100 is formed to penetrate the compliance plate 40 in its thickness direction. A region, other than the ink introducing port 44, in the region of the compliance plate 40 opposed to the reservoir 100 defines a flexible portion 43 formed thinly in the thickness direction. The reservoir 100 is sealed with the flexible portion 43. The flexible portion 43 imparts compliance to the interior of the reservoir 100. In more detail, the head case 230 having ink supply communicating paths 231 is provided on the compliance plate 40. In the head case 230, a depression 232 is formed in a region opposed to the flexible portion 43 so that flexible deformation of the flexible portion 43 takes place, as appropriate.

In the head case 230, a drive IC holding portion 233 penetrating the head case 230 in the thickness direction is provided in a region opposed to the drive IC 110 provided on the protective plate 30. The external wiring 111 is inserted through the drive IC holding portion 233, and connected to the drive IC 110.

With the ink-jet recording head 220 of the above-described configuration, ink from the ink cartridge is taken in through the ink introducing port 44 via the ink communicating path 212 (see FIG. 3) and the ink supply communicating path 231, filling up the interior of the head ranging from the reservoir 100 to the nozzle orifices 21. In this state, according to recording signals from the drive IC 110, voltage is applied to the respective piezoelectric element 300 corresponding to the pressure generating chamber 12 to flexibly deform the elastic film 50 and the piezoelectric element 300. As a result, the pressure inside the pressure generating chamber 12 rises to eject ink droplets through the nozzle orifice 21.

The respective members constituting the ink-jet recording head 220, and the head case 230 are provided with pin insertion holes 234, at two locations of corner portions thereof, for insertion of pins for positioning the respective members during assembly. By inserting the pins into the pin insertion holes 234 to position the respective members relatively, while joining the members to each other, the ink-jet recording head 220 and the head case 230 are combined integrally.

The above-mentioned ink-jet recording head 220 is formed by forming many chips simultaneously on a single silicon wafer, adhering them to the nozzle plate 20 and the compliance plate 40 to integrate these members, and then dividing the composite for each passage-forming substrate 10 of one chip size as shown in FIG. 4.

Four of the ink-jet recording heads 220 and four of the head cases 230 are fixed to the cartridge case 210 with predetermined spacing in the direction of parallel arrangement of the nozzle rows 21A, as shown in FIGS. 1 to 3. That is, the head unit 200 is provided with eight of the nozzle rows 21A.

As described above, there are provided many of the nozzle rows 21A comprising rows of the nozzle orifices 21 arranged parallel using the plurality of the ink-jet recording heads 220. By so doing, a decrease in yield can be prevented in comparison with the formation of many of the nozzle rows 21A in the single ink-jet recording head 220. Furthermore, the plurality of ink-jet recording heads 220 are used to achieve the arrangement of the multiple nozzle rows 21A. By so doing, it becomes possible to increase the yield of the ink-jet recording heads 220 which can be formed from the single silicon wafer. This can narrow the wasteful region of the silicon wafer to cut down on the cost of production.

The above four ink-jet recording heads 220 are positioned and held by the fixing plate 250, which is the common fixing member joined to the ink droplet ejection surfaces of the plural ink-jet recording heads 220, as shown in FIGS. 1 and 3. The fixing plate 250 comprises a flat plate, and has an exposure opening portion 251 which exposes the nozzle orifices 21, and a joining portion 252 which demarcates the exposure opening portion 251 and which is joined at least to opposite end portions, beside the nozzle rows 21A, of the ink droplet ejection surface of the ink-jet recording head 220.

The joining portion 252 is composed of a fixing frame portion 253 provided along the outer periphery of the ink droplet ejection surfaces of the plural ink-jet recording heads 220, and a fixing beam portion 254 extending between the adjacent ink-jet recording heads 220 to divide the exposure opening portion 251. The joining portion 252 comprising the fixing frame portion 253 and the fixing beam portion 254 is joined altogether to the ink droplet ejection surfaces of the plural ink-jet recording heads 220. The fixing frame portion 253 of the joining portion 252 is formed to close the pin insertion holes 234 which position the respective members during manufacture of the ink-jet recording head 220.

The preferred material for the fixing plate 250 is, for example, a metal such as stainless steel, glass-ceramics, or a single crystal silicon plate. For the fixing plate 250, it is preferred to use a material having the same thermal expansion coefficient as that of the nozzle plate 20 in order to prevent deformation due to the difference in thermal expansion from the nozzle plate 20. For example, when the nozzle plate 20 is formed from a single crystal silicon plate, it is preferred to form the fixing plate 250 from a single crystal silicon plate.

The fixing plate 250 is preferably formed thinly, desirably more thinly than the cover head 240 to be described later. If the fixing plate 250 is thick, ink is apt to remain, for example, between the ink droplet ejection surface of the nozzle plate 20 and the fixing beam portion 254 when the ink droplet ejection surface is wiped. However, the fixing plate 250 is formed thinly, whereby ink can be prevented from remaining on the ink droplet ejection surface of the nozzle plate 20 during wiping.

In the present embodiment, the thickness of the fixing plate 250 is set at 0.1 mm. The manner of joining between the fixing plate 250 and the nozzle plate 20 is not limited, and can be performed suitably, for example, using a thermosetting epoxy-based adhesive agent, or an ultraviolet curing adhesive agent.

As noted above, the fixing plate 250 closes the spaces between the adjacent ink-jet recording heads 220 by its fixing beam portion 254. Thus, ink does not enter the spaces between the adjacent ink-jet recording heads 220, and this can prevent ink-associated deterioration and destruction of the members of the ink-jet recording head 220, such as the piezoelectric element 300 and the drive IC 110. Moreover, the ink droplet ejection surface of the ink-jet recording head 220 and the fixing plate 250 are adhered together, without clearance, by the adhesive agent. Thus, the entry of a recording medium into the clearance, if any, can be prevented to prevent deformation of the fixing plate 250 and a paper jam.

As seen above, the above head unit 200 has the four ink-jet recording heads 220 secured to the fixing plate 250. Positioning of the ink-jet recording head 220 onto the fixing plate 250 is performed using an alignment apparatus to be described later.

Further, the head unit 200 is provided with the cover head 240, which is box-shaped to cover the respective ink-jet recording heads 220, on a side of the fixing plate 250 opposite from the ink-jet recording head 220, as shown in FIGS. 1 and 2. The cover head 240 has a fixing portion 242 provided with an opening portion 241 in correspondence with the exposure opening portion 251 of the fixing plate 250, and a side wall portion 245 provided on the lateral side of the ink droplet ejection surfaces of the ink-jet recording heads 220 so as to bend around the outer periphery of the fixing plate 250.

The fixing portion 242 is composed of a frame portion 243 provided in correspondence with the fixing frame portion 253 of the fixing plate 250, and a beam portion 244 provided in correspondence with the fixing beam portion 254 of the fixing plate 250 to divide the opening portion 241. The fixing portion 242 comprising the frame portion 243 and the beam portion 244 is joined to the joining portion 252 of the fixing plate 250.

As noted above, the ink droplet ejection surface of the ink-jet recording head 220 and the cover head 240 are joined together without clearance. Thus, the entry of a recording medium into the clearance, if any, can be prevented to prevent deformation of the cover plate 240 and a paper jam. Moreover, the side wall portion 245 of the cover head 240 covers the outer peripheral edge portion of the plural ink-jet recording heads 220, thus reliably preventing the wraparound of ink onto the side surface of the ink-jet recording head 220.

Examples of the material for the cover head 240 are metallic materials such as stainless steel. The cover head 240 may be formed by press working or molding a plate of such a metal. Also, the cover head 240 can be grounded if it is formed of an electroconductive metallic material.

Furthermore, the cover head 240 needs a certain degree of strength in order to protect the ink-jet recording head 220 from impact by wiping or capping. Thus, the cover head 240 needs to be relatively thick. In the present embodiment, the thickness of the cover head 240 is set at 0.2 mm.

The method of joining between the cover head 240 and the fixing plate 250 is not limited, and is, for example, adhesion using a thermosetting epoxy-based adhesive agent.

The fixing portion 242 is provided with flange portions 246 having fixing holes 247 for positioning and fixing the cover head 240 onto other member. The flange portion 246 is provided to bend so as to protrude from the side wall portion 245 in the same direction as the plane direction of the ink droplet ejection surface. The cover head 240 in the present embodiment is fixed to the cartridge case 210, which is the holding member holding the ink-jet recording heads 220 and the head cases 230, as shown in FIGS. 2 and 3.

In further detail, as shown in FIGS. 2 and 3, the cartridge case 210 is provided with protrusions 215 which protrude on the ink droplet ejection surface side and which are inserted into the fixing holes 247 of the cover head 240. By inserting the protrusions 215 into the fixing holes 247 of the cover head 240 and heating and caulking leading end portions of the protrusions 215, the cover head 240 is fixed to the cartridge case 210. The protrusion 215 provided on the cartridge case 210 is allowed to have a smaller outer diameter than that of the fixing hole 247 of the flange portion 246, whereby the cover head 240 can be positioned in the plane direction of the ink droplet ejection surface and fixed to the cartridge case 210.

The cover head 240 and the fixing plate 250 having the plurality of ink-jet recording heads 220 joined thereto are fixed together, with the fixing holes 247 of the cover head 240 and the plurality of nozzle rows 21A being positioned with respect to each other. This positioning between the fixing holes 247 of the cover head 240 and the plurality of nozzle rows 21A can be performed using the alignment apparatus to be described later. Alternatively, when the fixing plate 250 and the plurality of ink-jet recording heads 220 are positioned and fixed, the cover head 240 may simultaneously be positioned and fixed.

Embodiment

The alignment apparatus according to an embodiment of the invention will be described in detail with reference to the accompanying drawings. The same portions as those in FIGS. 1 to 5 are assigned the same numerals as those therein.

Figure 6:
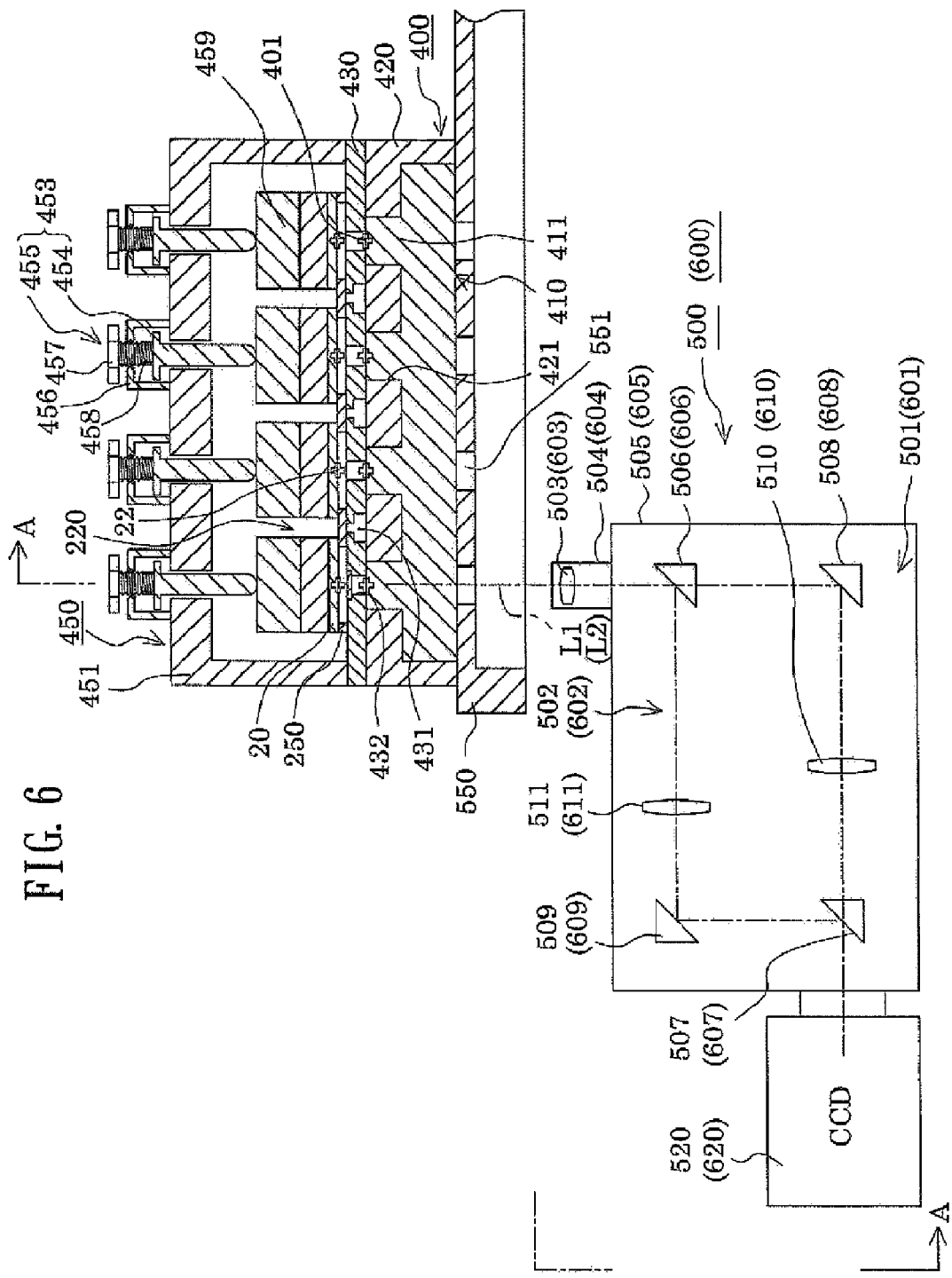
FIG. 6 is a sectional view showing an alignment apparatus according to the embodiment of the invention.
Figure 7:
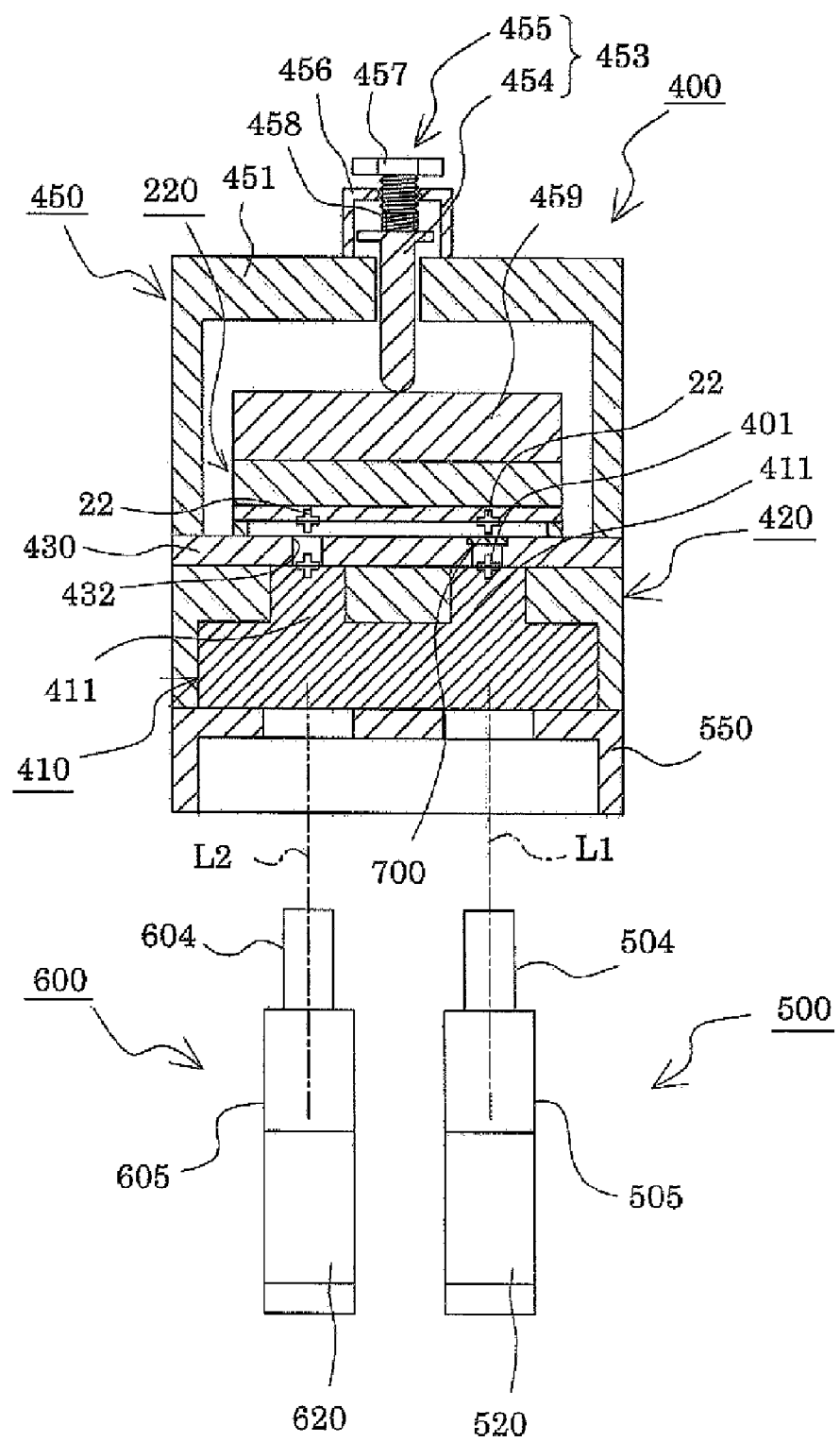
FIG. 7 is a sectional view taken on line A-A in FIG. 6.

FIG. 6 is a sectional view showing the alignment apparatus according to the embodiment of the invention. FIG. 7 is a sectional view taken on line A-A in FIG. 6. As shown in this drawing, the alignment apparatus according to this embodiment has two optical means composed of bifocal microscopes 500 and 600. This alignment apparatus is designed to be capable of positioning one ink-jet recording head at a predetermined position by use of two alignment marks.

As shown in FIGS. 6 and 7, the alignment apparatus according to the present embodiment has an alignment jig 400 on which the ink-jet recording heads 220 are placed, a pressing means 450 for pressing the ink-jet recording heads 220 against the fixing plate 250 integrally with the alignment jig 400, and the two bifocal microscopes 500 and 600 each having an optical system 501, 502 (601, 602) for observing the ink-jet recording head 220 from below the alignment jig 400 via the alignment jig 400.

Of these members, the alignment jig 400 has a mask 410 provided with reference marks 401, a base jig 420 for setting the mask 410 in place, and a spacer jig 430 disposed on the base jig 420 for holding the fixing plate 250 as the fixing member. In this configuration, the fixing plate 250 is held on the spacer jig 430, and the relative positional relationship between the reference mark 401 of the mask 410 and the alignment mark 22 of the nozzle plate 20 is confirmed by the bifocal microscope 500. During this process, alignment between the reference mark 401 and the alignment mark 22 is performed, while the fixing plate 250 and the nozzle plate 20 of the ink-jet recording head 220 are adhered together via the adhesive agent.

In further detail, the base jig 420 comprises stainless steel or the like in the shape of a box opening at the bottom surface. In the base jig 420, a single through-hole 421 penetrating in the thickness direction is provided in a region opposed to the region of the mask 410 where the reference mark 401 is provided. The through-hole 421 corresponds positionally to a communicating hole 432 of the spacer jig 430 to be described later.

The mask 410 comprises a transparent material allowing passage of light, for example, glass such as quartz and, in the present embodiment, has protrusions 411 which protrude into the through-hole 421 of the spacer jig 420 and which have the reference marks 401 formed at leading end portions thereof. The protrusion 411 is a cylindrical portion provided for each reference mark 401. In the present embodiment, two of the alignment marks 22 are provided in the nozzle plate 20 of each ink-jet recording head 220. Thus, two of the reference marks 401 are provided for each ink-jet recording head 220, so that total eight of the reference marks 401 are provided.

The reference mark 401 is preferably formed to be at a height in the vicinity of the alignment mark 22 of the nozzle plate 20. This is intended for decreasing the distance between the alignment mark 22 and the reference mark 401 to increase positioning accuracy. That is, the greater the distance between the reference mark 401 and the alignment mark 22, the more difficult it becomes to ensure the positioning accuracy. If a great distance exists between the reference mark 401 and the alignment mark 22, the optical axis of the optical system 501, 502 (601, 602) is greatly displaced because of heat of a metal halide lamp or the like, which is used when the position is confirmed by the optical system 501, 502 (601, 602). As a result, a great error occurs in the actual positions of the reference mark 401 and the alignment mark 22.

Assume that the protrusion 411 is not provided in the mask, and the distance between the alignment mark 22 and the reference mark 401 is, for example, about 5.1 mm. In this case, displacement of the optical axis reaches about 2.5 μm, at most. In the present embodiment, the provision of the protrusion 411 in the mask 410 decreases the distance between the reference mark 401 and the alignment mark 22 to 110 μm or less. By so doing, the above heat-associated displacement of the optical axis of the optical system 501, 502 (601, 602) can be decreased to 0.05 μm or less, thus ensuring high accuracy positioning.

If the protrusion 411 comes too close to the nozzle plate 20, the adhesive agent adhering the nozzle plate 20 and the fixing plate 250 may adhere to the leading end surface of the protrusion 411, making it impossible for the optical system 501, 502 (601, 602) to confirm the alignment mark 22 and the reference mark 401. Thus, the leading end surface of the protrusion 411 is preferably provided to be separated by a predetermined distance from the nozzle plate 20.

As noted above, the distance between the alignment mark 22 and the reference mark 401 is shortened by providing the mask 410 with the protrusion 411. Thus, it becomes unnecessary to shorten the distance between the reference mark 401 and the alignment mark 22 by reducing the thickness of the base jig 420. If the thickness of the base jig 420 is reduced in order to shorten the distance between the alignment mark 22 and the reference mark 401, the following problem occurs: When the ink-jet recording head 220 is pressed against the fixing plate 250, the base jig 420 is deformed or destroyed. As a result, an error occurs in the alignment between the reference mark 401 and the alignment mark 22. In the present embodiment, on the other hand, the mask 410 is provided with the protrusion 411. Thus, there is no need to form the base jig 420 thinly. Consequently, the rigidity of the base jig 420 can be maintained to prevent deformation or destruction. This can also contribute to highly accurate positioning.

The mask 410 is detachably held by the base jig 420, and can be used in other alignment jig, for example, when the fixing plate 250 and the ink-jet recording head 220 are adhered by curing of the adhesive agent. This can cut down on the cost of the alignment jig 400.

The spacer jig 430 is held on a surface of the base jig 420 opposite to its surface, on which the mask 410 is disposed, to hold the fixing plate 250. In further detail, the spacer jig 430 is provided with a plurality of suction chambers 431, each of which comprises a plate-shaped member such as stainless steel and has a suction means, such as a vacuum pump (not shown), connected to its interior. The suction chamber 431 opens to the surface of the spacer jig 430 for sucking and holding the surface of the fixing plate 250. The spacer jig 430 is provided with communicating holes 432, each of which becomes a space, so that the alignment mark 22 of the ink-jet recording head 220 held by the fixing plate 250 upon suction can be confirmed from below the bottom surface of the mask 410 through the communicating hole 432. That is, the spacer jig 430 is disposed between the fixing plate 250 and the mask 410 in such a manner as to make contact, on one surface, with the fixing plate 250 and make contact, on the other surface, with the mask 410 so that the reference mark 401 and the alignment mark 22 are opposed to each other via the space.

The pressing means 450 for pressing the ink-jet recording head 220 toward the fixing plate 250 is disposed on the above-mentioned alignment jig 400. That is, the pressing means 450 has a U-shaped arm portion 451 having both ends placed on the spacer jig 430 and arranged above the ink-jet recording head 220, and pressing portions 453 provided in the arm portion 451 for pressing the ink-jet recording heads 220 toward the fixing plate 250.

The pressing portions 453 are provided in regions of the arm portion 451 opposed the respective ink-jet recording heads 220. In the present embodiment, four of the ink-jet recording heads 220 are fixed to the single fixing plate 250. Thus, four (the same number as the number of the ink-jet recording heads 220) of the pressing portions 453 are provided in correspondence with the ink-jet recording heads 220.

Each pressing portion 453 is composed of a pressing pin 454 of a cylindrical shape inserted through the arm portion 451 and provided to be movable in the axial direction, an urging means 455 provided on a proximal end side of the pressing pin 454 for urging the pressing pin 454 toward the ink-jet recording head 220, and a pressing dowel 459 placed between the pressing pin 454 and the ink-jet recording head 220.

The pressing pin 454 has a leading end formed in a semispherical shape, and makes a point contact with the top of the pressing dowel 459 to press the pressing dowel 459.

The urging means 455 is provided in the arm portion 451 for urging the pressing pin 454 toward the ink-jet recording head 220. In the present embodiment, the urging means 455 has a thread holding portion 456 provided to surround the proximal end side of the pressing pin 454, a threaded portion 457 screwed to the thread holding portion 456, and an urging spring 458 provided between the leading end surface of the threaded portion 457 and a proximal end portion of the pressing pin 454.

Thus, the urging means 455 can adjust the pressure, with which the urging spring 458 presses the pressing pin 454, depending on the amount of clamping against the thread holding portion 456 by the threaded portion 457. By this means, the pressure with which the pressing pin 454 presses the pressing dowel 459 can be adjusted.

The pressing dowel 459 is placed between the pressing pin 454 and the protective plate 30 of the ink-jet recording head 220. The pressing pin 454 makes a point contact with the upper surface of the pressing dowel 459, and the pressing force of the pressing pin 454 is spread uniformly to nearly the entire surface of the protective plate 30 of the ink-jet recording head 220. In this state, the ink-jet recording head 220 can be pressed. Instead of bringing the leading end of the pressing pin 454 into direct contact with the top of the protective plate 30 of the ink-jet recording head 220, the whole of the ink-jet recording head 220 is pressed by the pressing dowel 459. Thus, the ink-jet recording head 220 can be reliably fixed to the fixing plate 250. The pressing dowel 459 has an outer peripheral shape of the same size as, or a slightly smaller size than, the size of the outer peripheral shape of the protective plate 30 of the ink-jet recording head 220.

As described above, the alignment jig 400 integrated with the pressing means 450 is disposed on a moving table 550, and is designed to be moved, as appropriate, in a horizontal direction perpendicular to the optical axes L1 and L2 of the bifocal microscopes 500 and 600. Thus, the moving table 550 is moved, with the optical axes L1 and L2 being fixed. By so doing, each alignment mark 22 corresponding to each ink-jet recording head 220 can be allowed to lie on the optical axes L1, L2 together with each reference mark 401. In a region of the moving table 550 where the optical axes L1, L2 pass while heading for the mask 410, through-holes 551 are provided to ensure optical paths leading to the alignment marks 22 via the reference marks 401.

The bifocal microscope 500 has one optical system 501 and another optical system 502 having the optical axis L1 in common. The optical axis L1 is pointed in the direction of the alignment mark 22 via the reference mark 401 and the communicating hole 432, as a space, from the side of the mask 410 opposite to the spacer jig. The optical system 501 can focus on the reference mark 401, while the optical system 502 can focus on the alignment mark 22.

In more detail, an objective lens 503 is accommodated in a lens-barrel 504, with the optical axis L1 being pointed in the direction of the reference mark 401 and the alignment mark 22. The lens-barrel 504 is fixed to a casing 505. Within the casing 505, two beam splitters 506 and 507, two mirrors 508 and 509, and two focal lenses 510 and 511 are accommodated.

The optical system 501 is formed from the beam splitter 506, the mirror 508, the focal lens 510, and the beam splitter 507. The optical system 501 has an optical path (indicated by dashed dotted lines in the drawing) in which light, which has passed through the beam splitter 506, is reflected by the mirror 508, passed through the focal lens 510, and then led to the outside via the beam splitter 507.

The optical system 502 is formed from the beam splitter 506, the focal lens 511, the mirror 509, and the beam splitter 507. The optical system 502 has an optical path (indicated by dashed dotted lines in the drawing) in which light, which has been reflected by the beam splitter 506, is passed through the focal lens 511, then reflected by the mirror 509 and the beam splitter 507, and then led to the outside.

A CCD 520, which is an imaging means, takes in an image of the reference mark 401 and an image of the alignment mark 22 simultaneously via the optical systems 501 and 502, and reproduces the images. By adjusting the focal position of the focal lens 510, the image of the reference mark 401 is focused onto the CCD 520. By adjusting the focal position of the focal lens 511, the image of the alignment mark 22 is focused onto the CCD 520. In this manner, clear images of the reference mark 401 and the alignment mark 22 can be focused individually on the CCD 520. The position of the ink-jet recording head 220 is adjusted such that these images are superimposed, whereby predetermined alignment is carried out.

The foregoing descriptions concern the bifocal microscope 500, and the other bifocal microscope 600 also has exactly the same configuration. Thus, the portions of the bifocal microscope 600, which correspond to the respective portions of the bifocal microscope 500, are assigned numerals obtained by adding "100" to the numerals of the respective portions of the bifocal microscope 500, in order to omit duplicate explanations.

The present embodiment has the two bifocal microscopes 500 and 600 so that the two alignment marks 22 and 22 formed at opposite end portions in the longitudinal direction of the nozzle plate 20 of the ink-jet recording head 220 can be observed at the same time, and the distance between the optical axes L1 and L2 of the bifocal microscopes 500 and 600 is in agreement with the distance between the two alignment marks 22 and 22. Hence, when the reference marks 401, 401 and the alignment marks 22, 22 are located on the optical axes L1, L2, the ink-jet recording head 220 is positioned in a predetermined manner relative to the fixing plate 250.

The procedure for the positioning is common to the two bifocal microscopes 500 and 600. The procedure simply comprises taking in the images of the two alignment marks 22 and 22 and the corresponding reference marks 401 and 401 by the two bifocal microscopes 500 and 600, and parallel-processing these images. This procedure itself is essentially the same as that for one bifocal microscope.

However, when parallel processing is performed using the two bifocal microscopes 500 and 600 as above, predetermined alignment for one ink-jet recording head 220 is completed by single positional adjustment based on the two sets of the reference marks 401 and the alignment marks 22. Thus, a prompt alignment operation can be performed, in comparison with an alignment operation based on one set of the reference mark 401 and the alignment mark 22. In the case of one bifocal microscope, in particular, predetermined alignment is carried out for one ink-jet recording head 220 with the use of the reference mark 401 and the alignment mark 22 located on one side, and then predetermined alignment is carried out with the use of the reference mark 401 and the alignment mark 22 located on the other side. During this process, the adjusted position may be displaced. In view of this possibility, the operating efficiency of the above-mentioned alignment operation using the two bifocal microscopes 500, 600 is even better.

In performing alignment using the two bifocal microscopes 500 and 600 as in the present embodiment, the optical axes L1 and L2 of the bifocal microscopes 500 and 600 need to coincide relatively with each other. With the alignment apparatus according to the present embodiment, therefore, the optical axes L1 and L2 are adjusted prior to the predetermined alignment of the ink-jet recording head 220. Thus, the alignment apparatus according to the present embodiment has a mirror 700 for optical axis adjustment.

Figure 8A:
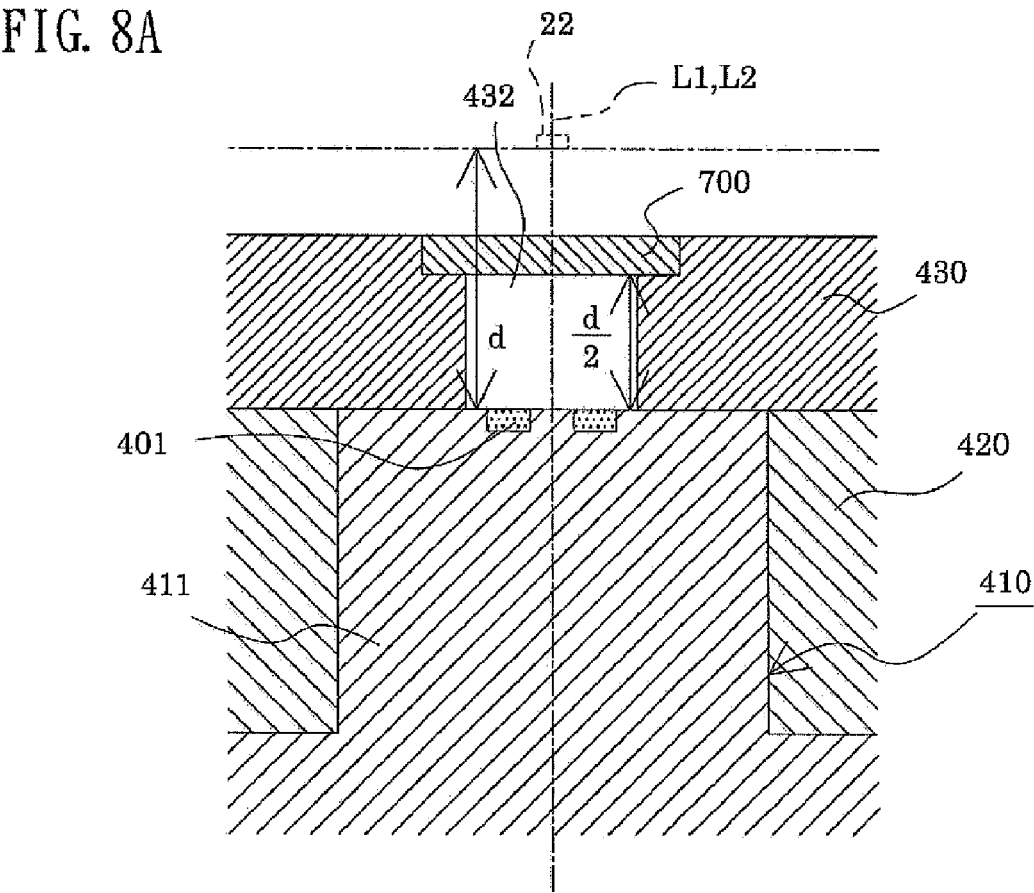
FIGS. 8A to 8C are explanation drawings showing, in an enlarged manner, parts of FIG. 6.
Figure 8B:
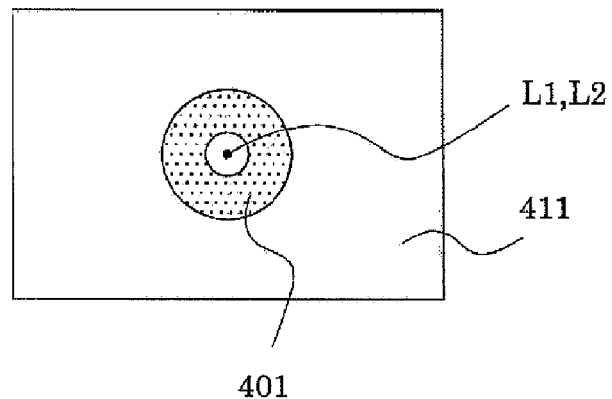
Figure 8C:
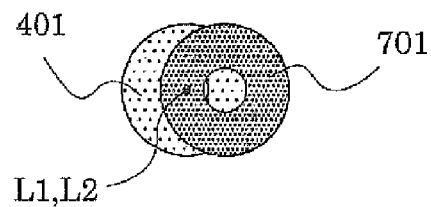

A detailed description will be offered of optical axis adjustment with the addition of FIGS. 8A to 8C. FIG. 8A is a sectional view showing, in an extracted and enlarged manner, parts of FIG. 6 and FIG. 7 (portions in the vicinity of the mirror 700) during optical axis adjustment. FIG. 8B is a plan view of the portion of the reference mark 401 viewed from above the mask 410. FIG. 8C is an explanation drawing conceptually showing a real image of the reference mark 401 and a virtual image of the reference mark 401 reflected in the mirror 700 which are obtained as image information by the bifocal microscope 500, 600.

As shown in FIG. 8A, the reference mark 401 with which the alignment mark 22 (see FIG. 6) is aligned is provided in the mask 410 as a transparent member. No particular limitations are imposed on the shape of the reference mark 401, but the reference mark 401 is ring-shaped in the present embodiment.

The mirror 700 is detachably fitted in and fixed to the spacer jig 430 so as to close the upper end opening portion of the communicating hole 432 of the base jig 420 and to parallel the protrusion 411 of the mask 410. That is, the mirror 700 is fixed to the spacer jig 430, for example, by the action of a negative pressure when the alignment apparatus is in the optical axis adjustment mode. When the alignment apparatus is in the alignment mode, the mirror 700 is detached from the spacer jig 430 to ensure an optical path leading from the mask 410 to the nozzle plate 20 (see FIG. 6).

Here, let the distance from the reference mark 401 of the mask 410 to the alignment mark 22 of the ink-jet recording head 220 (see FIG. 6) be "d". In this case, the mirror 700 is disposed such that the distance from the reference mark 401 to the mirror 700 is (½)·d.

Setting the position of the mirror 700 to fulfill the condition (½)·d is not indispensable. By fulfilling the condition (½)·d, however, the position of the virtual image of the reference mark 401 reflected in the mirror 700 can be brought into agreement with the position of the alignment mark 22 of the nozzle plate 20. Thus, the focal position of the bifocal microscopes 500, 600 is brought to the virtual image during optical axis adjustment. By this measure, the characteristic action and effect that the alignment mark 22 is automatically focused on during alignment can be obtained.

Optical Axis Adjustment:

The method of adjusting the optical axes L1 and L2 of the bifocal microscopes 500 and 600 in the alignment apparatus according to the present embodiment will be described.

1) The mirror 700, which reflects the image of the reference mark 401 to form its virtual image, is disposed between the mask 410 provided with the reference mark 401 and the ink-jet recording head 220 (workpiece) such that the mirror 700 is parallel to and opposed to the mask 410. An adjustment is made such that the optical axis L1 is positioned at the center of the reference mark 401 to be coaxial, as shown in FIG. 8B.

2) In the state of 1), the optical axis L1 is pointed in the direction of the mirror 700 from the side of the mask 410, and the reference mark 401 and a virtual image of the reference mark 401 reflected in the mirror 700 are simultaneously observed. Here, one of the optical system, 501 (see FIG. 6), of the bifocal microscope 500 is used to focus on the real image of the reference mark 401, and the other optical system 502 (see FIG. 6) is used to focus on the virtual image of the reference mark 401 reflected in the mirror 700. Also, both images are superposed and observed. If, on this occasion, the optical axis L1 is not orthogonal to the plane of the mirror 700, but is inclined, the real image of the reference mark 401 and its virtual image 701 are displaced with respect to each other, as shown in FIG. 8C.

Thus, the inclination of the optical axis L1 is adjusted to superpose the virtual image 701 on the real image of the reference mark 401. When the virtual image 701 is superimposed completely on the real image of the reference mark 401, predetermined adjustment of the optical axis L1 is completed.

3) In connection with the optical axis L2 of the bifocal microscope 600 as well, the same adjustment is made in the same manner as in 2). As a result, the relative parallel relationship between the optical axes L1 and L2 is fulfilled at the same time. Pivoting of the optical axes L1, L2 attendant on such optical axis adjustment is carried out by using an optical axis adjusting unit (not shown). The adjusting unit makes optical axis adjustment of the optical axis L1, L2, based on the observation by the bifocal microscope 600, such that a real image of the reference mark 401 and the virtual image 701 of the reference mark 401 reflected in the mirror 700 are superposed.

Alignment Method:

Next, an explanation will be offered for the method of aligning the ink-jet recording head 220 with a predetermined position by use of the alignment apparatus according to the present embodiment.

FIGS. 9A to 9C are bottom views showing the status of the alignment jig 400, when viewed from the bottom surface side, during alignment of the ink-jet recording head 220.

1) As shown in FIG. 9A, the reference marks 401, 401 are confirmed by the bifocal microscopes 500, 600 from the bottom surface side of the alignment jig 400.
2) As shown in FIG. 9B, the fixing plate 250 is held by the alignment jig 400. This is done by placing and fixing the fixing plate 250 on the upper surface of the spacer jig 430. On this occasion, the spacer jig 430 fixes the fixing plate 250 by sucking the fixing plate 250 via the suction chambers 431.
3) In the optical systems 501, 601 of the bifocal microscopes 500, 600, images of the reference marks 401, 401 are focused by the adjustment of the focal lenses 510, 610, and taken into the CCDs 520, 620. In the other optical systems 502, 602, images of the alignment marks 22, 22 are focused by the adjustment of the focal lenses 511, 611, and taken into the CCDs 520, 620. As a result, clear images focused on the reference marks 401, 401 and the alignment marks 22, 22 are incorporated into the CCDs 520, 620. That is, the optical systems (501, 502) and (601, 602) have the optical axes L1, L2 in common, but can focus individually on the objects at different positions (i.e., reference marks 401, 401 and alignment marks 22, 22). Thus, they obtain clear images of the reference marks 401, 401 and the alignment marks 22, 22 at sufficient magnification with decreased depths of field.
4) As shown in FIG. 9C, the ink-jet recording head 220 and the fixing plate 250 are brought into contact via the adhesive agent. That is, based on the images of the reference marks 401, 401 and the alignment marks 22, 22 obtained in the step 3) above, the position of the ink-jet recording head 220 is adjusted such that the reference marks 401, 401 and the alignment marks 22, 22 are in the predetermined positional relationship, and also the ink-jet recording head 220 is brought into contact with the fixing plate 250 via the adhesive agent.

The fixing plate 250 is positioned and held by the alignment jig 400. Thus, the mask 410 and the ink-jet recording head 220 are positioned with respect to each other, whereby the fixing plate 250 and the ink-jet recording head 220 can also be positioned with respect to each other.

Positioning of the ink-jet recording head 220 with respect to the fixing plate 250 may be performed by fine positional adjustment using a micrometer or the like (not shown) while an operator is visually recognizing the images on the CCDs 520, 620. Alternatively, the positioning may be performed automatically by subjecting the output images of the CCDs 520, 620 to image processing to drive the micrometer or the like by a drive motor or the like.

5) The same step as the step in 4) above (FIG. 9C) is repeated to position the plurality of ink-jet recording heads 220 on the fixing plate 250 sequentially. That is, with the optical axes L1, L2 being fixed, the moving table 550 is moved in a horizontal plane in the X-axis direction in FIG. 9C, whereby the alignment marks 22, 22 of the other ink-jet recording heads 220 adjacent to each other are aligned with the reference marks 401, 401.
6) The plurality of ink-jet recording heads 220 are pressed against the fixing plate 250 at a predetermined pressure by means of the pressing means 450, with the adhesive agent being cured, whereby the ink-jet recording heads 220 are joined to the fixing plate 250.

By so joining the fixing plate 250 and the plurality of ink-jet recording heads 220, while performing positioning, the fixing plate 250 and the nozzle rows 21A can be positioned with respect to each other with high accuracy. Moreover, the relative positioning of the nozzle rows 21A of the adjacent ink-jet recording heads 220 can be carried out highly accurately. Furthermore, the ink-jet recording head 220 is contacted with and joined to the fixing plate 250 comprising the flat plate. Thus, simply by joining the ink-jet recording head 220 to the fixing plate 250, the relative positioning in the ink droplet ejection direction of the plurality of ink-jet recording heads 220 is performed. Hence, there is no need to align the plurality of ink-jet recording heads 220 in the ink droplet ejection direction, and deviation in the landing position of ink droplets can be prevented reliably.

In the present embodiment, in particular, the space due to the spacer jig 430 exists between the mask 410 provided with the reference marks 401, 401 and the nozzle plate 20 provided with the alignment marks 22, 22. Thus, the height positions of the reference marks 401, 401 and the alignment marks 22, 22 are different from each other. However, the focuses of the reference marks 401, 401 and the alignment marks 22, 22 can be adjusted, respectively, by the two optical systems (501, 502) and (601, 602). Consequently, the images of the reference marks 401, 401 and the alignment marks 22, 22 are so clear that high accuracy positioning can take place.

Other Embodiments

The alignment apparatus according to the above-described embodiment has the two bifocal microscopes 500 and 600, but this is not limitative. If positioning is performed for one alignment mark 22 by single alignment, at least one bifocal microscope 500 as an optical means may be provided. Nor is the bifocal microscope 500 necessarily needed, and an ordinary single-focus microscope may be used. However, it is only natural that the use of the bifocal microscope 500 presents the aforementioned various advantages.

Needless to say, moreover, the workpiece is not limited to the ink-jet recording head 220. Besides, the pressing means 450 is provided on the alignment jig 400, but this is not limitative. For example, if an ultraviolet curing adhesive agent is used as an adhesive agent for joining the fixing plate 250 and the ink-jet recording head 220, the adhesive agent is coated onto the joining surface of the fixing plate 250. Then, with the fixing plate 250 and the ink-jet recording head 220 in contact, ultraviolet radiation is applied to cure the adhesive agent, whereby the fixing plate 250 and the ink-jet recording head 220 can be joined. Thus, the pressing means 450 can be omitted. The ultraviolet curing adhesive agent need not be cured, with the fixing plate 250 and the ink-jet recording head 220 being pressed under a predetermined pressure, unlike a thermosetting adhesive agent. If pressure is applied, the ink-jet recording head 220 and the fixing plate 250 can be joined together with high accuracy, with positional displacement between them being prevented.

Joining using the ultraviolet curing adhesive agent imparts a relatively low joining strength. Thus, it is recommendable that after the fixing plate 250 and the ink-jet recording head 220 are joined using the ultraviolet curing adhesive agent, the periphery of corners defined by the ink-jet recording head 220 and the fixing plate 250 is fixed using a thermosetting adhesive agent. By this measure, the fixing plate 250 and the ink-jet recording head 220 can be joined highly accurately and firmly to enhance reliability.

In the above embodiments, the fixing plate 250 comprising the flat plate is illustrated as the fixing member for joining the plurality of ink-jet recording heads 220 thereto. However, the fixing member is not limited to the fixing plate 250. For example, the plurality of ink-jet recording heads 220 may be directly positioned on and joined to the cover head 240. Even in this case, the plurality of ink-jet recording heads 220 can be joined, with high accuracy positioning, with the use of the aforementioned alignment jig 400.

In the above embodiments, the ink-jet recording head 220 of the flexural vibration type is illustrated, but this is not limitative. It goes without saying that the invention can be applied to head units having ink-jet recording heads of various structures, such as, for example, an ink-jet recording head of the longitudinal vibration type in which piezoelectric materials and electrode-forming materials are alternately stacked, and expanded and contracted in the axial direction, and an ink-jet recording head for ejecting ink droplets by bubbles produced by heat generation of a heat-generating element or the like.

In the above embodiments, the head unit having the ink-jet recording heads for ejection of ink as liquid-jet heads to be aligned is illustrated as an example. However, this is not limitative, and the invention can be generally applied in producing liquid-jet head units having wide varieties of liquid-jet heads. Examples of the liquid-jet heads are recording heads for use in image recording devices such as printers, color material jet heads for use in the production of color filters such as liquid crystal displays, electrode material jet heads for use in the formation of electrodes for organic EL displays and FED (face emitting displays), and bio-organic material jet heads for use in the production of biochips. It should be understood that such changes, substitutions and alterations can be made in the invention without departing from the spirit and scope of the invention as defined by the appended claims.

What is claimed is:

1. An alignment apparatus, which is used when positioning and joining a plurality of workpieces relative to each other, each workpiece having a plurality of alignment marks for alignment, the alignment apparatus comprising:
   a transparent mask provided with reference marks with which the alignment marks are aligned;
   a mirror disposed between the mask and a workpiece;
   an optical unit having an optical axis pointed in a direction of the mirror via a reference mark from a side of the mask opposing the mirror, the optical unit enabling the reference mark and a virtual image of the reference mark reflected in the mirror to be observed simultaneously; and
   an adjusting unit for making optical axis adjustment of the optical axis, based on the observation by the optical unit, such that a real image of the reference mark and the virtual image of the reference mark reflected in the mirror are superposed.

2. The alignment apparatus according to claim 1, wherein the mirror is disposed such that when a distance from the reference mark of the mask to an alignment mark of the workpiece is d, a distance from the reference mark to the mirror is ($\frac{1}{2}$)·d.

3. The alignment apparatus according to claim 1, wherein the mask has a protrusion protruding along the optical axis toward an alignment mark, and the reference marks are provided in the protrusion.

4. The alignment apparatus according to claim 1, further comprising:
   a plurality of optical units having a plurality of optical axes independent of each other.

5. The alignment apparatus according to claim 1, wherein the optical unit is composed of a bifocal microscope including two optical systems having the optical axis in common, one of the optical systems being capable of focusing on the real image of the reference mark, and the other optical system being capable of focusing on the virtual image of the reference mark reflected in the mirror.

6. The alignment apparatus according to claim 1, wherein the workpiece is a liquid-jet head.

7. An alignment method, which is used when positioning and joining a plurality of workpieces relative to each other, each workpiece having a plurality of alignment marks for alignment, the alignment method comprising the steps of:
   disposing a mirror between a mask and a workpiece such that the mask and the mirror are opposed to each other, the mask, as a transparent member, being provided with reference marks with which the alignment marks are aligned, the mirror reflecting an image of a reference mark to form a virtual image of the reference mark;
   simultaneously observing the reference mark and the virtual image of the reference mark reflected in the mirror by an optical unit having an optical axis pointed in a direction of the mirror from a side of the mask; and
   making optical axis adjustment of the optical axis, based on the observation by the optical unit, such that a real image of the reference mark and the virtual image of the reference mark reflected in the mirror are superposed.

* * * * *